United States Patent
Gada et al.

(10) Patent No.: US 11,567,557 B2
(45) Date of Patent: Jan. 31, 2023

(54) ELECTRICAL POWER OPERATING STATES FOR CORE LOGIC IN A MEMORY PHYSICAL LAYER

(71) Applicant: Advanced Micro Devices, Inc., Santa Clara, CA (US)

(72) Inventors: Sridhar Varadharajulu Gada, Bangalore (IN); Sonu Arora, Princeton, NJ (US); Xiaojie He, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 218 days.

(21) Appl. No.: 16/729,805

(22) Filed: Dec. 30, 2019

(65) Prior Publication Data
US 2021/0200297 A1    Jul. 1, 2021

(51) Int. Cl.
| | |
|---|---|
| G06F 1/00 | (2006.01) |
| G06F 1/3234 | (2019.01) |
| G06F 1/3296 | (2019.01) |
| G06F 1/3287 | (2019.01) |
| G05F 1/46 | (2006.01) |

(52) U.S. Cl.
CPC .......... *G06F 1/3275* (2013.01); *G06F 1/3287* (2013.01); *G06F 1/3296* (2013.01); *G05F 1/46* (2013.01)

(58) Field of Classification Search
CPC .... G06F 1/3275; G06F 1/3287; G06F 1/3296; G05F 1/46
See application file for complete search history.

(56) References Cited

U.S. PATENT DOCUMENTS

| | | | | |
|---|---|---|---|---|
| 2009/0256547 A1* | 10/2009 | Akyildiz | ................. | H02J 9/005 |
| | | | | 323/350 |
| 2011/0264934 A1* | 10/2011 | Branover | .............. | G06F 1/3287 |
| | | | | 713/320 |
| 2014/0028278 A1* | 1/2014 | Pedersen | ............... | G06F 1/3296 |
| | | | | 323/304 |
| 2014/0068166 A1* | 3/2014 | Fukumura | ........... | G06F 13/1668 |
| | | | | 711/104 |
| 2014/0351615 A1* | 11/2014 | Gupta | ................ | H03K 19/0016 |
| | | | | 713/322 |
| 2019/0385670 A1* | 12/2019 | Notani | ............. | G11C 29/50008 |

* cited by examiner

*Primary Examiner* — Xuxing Chen
(74) *Attorney, Agent, or Firm* — Park, Vaughan, Fleming & Dowler LLP

(57) ABSTRACT

An electronic device has a memory functional block that includes memory circuits and a memory physical layer (PHY) functional block with core logic that controls operations in the memory functional block, a memory PHY voltage regulator, a system voltage regulator, and a controller. The electronic device also includes a switch having an input coupled to an output of the memory PHY voltage regulator, another input coupled to an output of the system voltage regulator, and an output coupled to a power supply input of the core logic. The controller sets the switch so that electrical power is provided from the memory PHY voltage regulator to the core logic in a full power operating state. The controller sets the switch so that electrical power is provided from the system voltage regulator to the core logic in one or more low power operating states.

22 Claims, 6 Drawing Sheets

ELECTRICAL POWER OPERATING STATES FOR CORE LOGIC IN A MEMORY PHYSICAL LAYER

BACKGROUND

Related Art

For many electronic devices, and particularly those that operate using electrical power supplied from batteries, electrical power consumption is an important concern. Some electronic devices therefore support low power operating states that are used for assisting the electronic devices in conserving electrical power during operation. For example, some electronic devices support at least one low power operating state in which voltages provided to circuitry (e.g., integrated circuits, discrete components, etc.) in the electronic devices are reduced relative to voltages provided to the circuitry in a full power operating state. Because electrical power consumption is proportional to the voltage used in circuitry, reducing the voltage in the at least one low power operating state has the effect of reducing the electrical power consumed by such electronic devices. As other examples, electronic devices can support low power operating states in which operating parameters such as electrical current, controlling clock frequencies, operational rates, etc. are reduced, alone or in combination with one another (and/or voltage), in order to conserve electrical power.

Although low power operating states are beneficial in helping electronic devices to conserve electrical power, low power operating states can be associated with inefficiencies of their own. For example, electrical power circuitry that provides electrical power to other circuitry in an electronic device may be designed and provisioned to operate effectively at a maximum electrical power load for the other circuitry—and may operate inefficiently in lower power operating states. For instance, voltage regulators that are provisioned for maximum electrical power loads, but that are also used to reduce relatively high input voltages to the lower voltages to be provided to circuitry in low power operating states may themselves experience noticeable electrical power losses in the low power operating states. As another example, entering and exiting low power states can be relatively slow and/or require significant effort, which can lead to undesirable delay in transitioning between operating states. For instance, an electronic device may need to store electronic device operating state before reducing voltages below a given voltage in a low power operating state and subsequently restore the operating state before resuming operation in higher powered operating states.

BRIEF DESCRIPTION OF THE FIGURES

Throughout the figures and the description, like reference numerals refer to the same figure elements.

DETAILED DESCRIPTION

Figure 1:
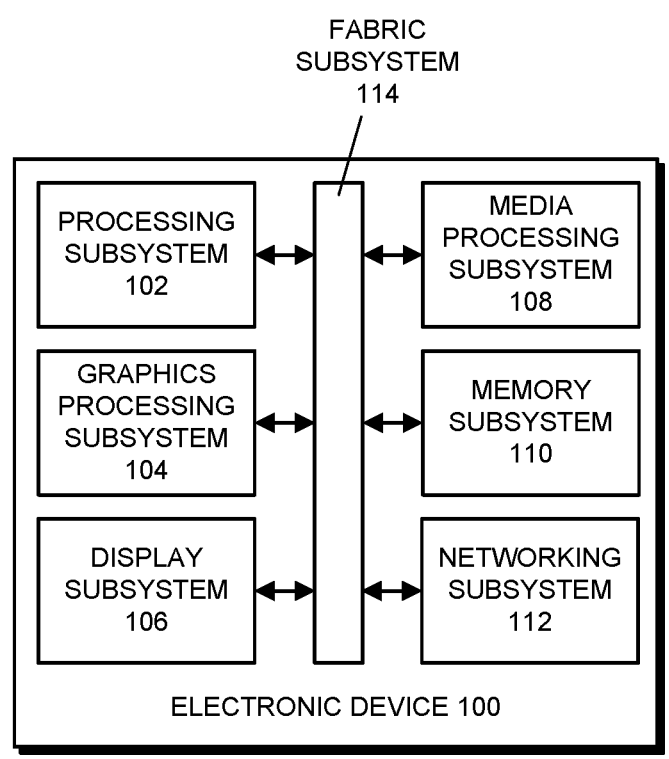
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit this term.

Functional block: functional block refers to a group, collection, and/or set of one or more interrelated circuit elements such as integrated circuit elements/circuitry, discrete circuit elements/circuitry, etc. The circuit elements are "interrelated" in that circuit elements share at least one property. For example, the interrelated circuit elements may be included in, fabricated on, or otherwise coupled to a particular integrated circuit chip, substrate, circuit board, or portion thereof, may be involved in the performance of given functions (computational or processing functions, memory functions, etc.), may be controlled by a common control element and/or a common clock, etc. A functional block can include circuitry having any number of circuit elements, from a single circuit element (e.g., a single integrated circuit logic gate or discrete circuit element) to millions or billions of circuit elements (e.g., an integrated circuit memory).

Overview

In the described embodiments, an electronic device includes subsystems such as a processing subsystem, a display subsystem, a media processing subsystem, and a memory subsystem that are communicatively coupled via a fabric (e.g., one or more buses, interconnects, networks, etc.). The memory subsystem includes memory circuitry for storing copies of data (e.g., inputs or results from computational operations, instructions, control or configuration values, etc.) and memory physical layer (PHY) circuitry for accessing data stored in the memory. The memory PHY includes core logic circuitry that manages accesses of the memory as well as controlling other operations in the memory subsystem. The electronic device also includes a number of voltage regulators that provide electrical power to the subsystems in the electronic device. The voltage regulators include a system voltage regulator that provides electrical power to the media processing subsystem, the display subsystem, and at least part of the fabric, and a memory PHY voltage regulator that provides electrical power to the memory subsystem. In the described embodiments, the system voltage regulator and memory PHY voltage regulator are selectively used for providing electrical power to the core logic in corresponding operating states for the core logic.

In the described embodiments, the electronic device supports several operating states for the core logic in the memory PHY. The operating states include a full power operating state and a number of low power operating states, with each of the operating states being associated with a respective different voltage at which electrical power is to be provided to the core logic. Generally, for the full power operating state, the core logic is provided electrical power at a full power voltage—and therefore operates typically or normally (i.e., without reductions in performance associated with a reduced voltage level). For each of the low power operating states, the core logic is provided electrical power at a respective reduced voltage level—and therefore operates with corresponding reductions in performance.

In some embodiments, for the full power operating state for the core logic in the memory PHY, the core logic is provided electrical power by the memory PHY voltage regulator via a local low dropout (LDO) voltage regulator in the memory PHY (or elsewhere in the electronic device). The memory PHY voltage regulator, which also provides electrical power to the memory circuitry and input-output (TO) circuitry in the memory PHY, provides electrical power at a higher voltage (e.g., at voltage sufficient to operate the memory circuitry and the IO circuitry). The LDO receives the electrical power output of the memory PHY voltage regulator and provides electrical power to the core logic at the full power voltage (e.g., 0.6 V or another voltage). For the low power operating states for the core logic in the memory PHY, the core logic is provided electrical power from the system voltage regulator. In the low power operating states, the electrical power is provided to the core logic directly from the system voltage regulator, with the local LDO voltage regulator bypassed (and possibly electrically powered down). The system voltage regulator, which also provides electrical power to the display subsystem and the media processing subsystem, provides electrical power at various voltage levels based on criteria relating to the activity and/or busyness of the electronic device or functional blocks therein.

In some embodiments, the low power operating states include a "low activity" operating state, during which the system voltage regulator provides electrical power to the core logic at a low activity voltage that is lower than the full power voltage (e.g., 0.5 V or another voltage). The low activity voltage is sufficient for circuitry in the core logic to continue limited operation—but is low enough that the core logic experiences a corresponding reduction in performance (e.g., performs operations more slowly than in the full power operating state). The low power operating states also include a "retention" operating state, during which the system voltage regulator provides electrical power to the core logic at a retention voltage that is lower than the low activity voltage (e.g., 0.4 V or another voltage). The retention voltage is insufficient for circuitry in the core logic to continue reliable operation, but is sufficient to retain state information for the circuitry in the core logic. The low power operating states further include a "power off" operating state during which the system voltage regulator provides no electrical power to the core logic.

In the described embodiments, the electronic device includes a two-input one-output switch circuit that is used for controlling a voltage regulator from which the core logic in the memory PHY receives electrical power. The first input of the switch is coupled to an electrical power outlet of the memory PHY voltage regulator, the second input of the switch is coupled to an electrical power output of the system voltage regulator, and the output of the switch is coupled to a power supply input of the core logic. For the full power operating state, a controller in the electronic device sets the switch so that the memory PHY voltage regulator provides electrical power to the core logic via the local LDO. For the low activity, retention, and power off operating states, the controller sets the switch so that the system voltage regulator provides electrical power to the core logic.

In some embodiments, the controller in the electronic device monitors memory access activity and the busyness/idleness of the core logic and sets the operating state of the core logic based on the rates of memory access activity and/or lengths of periods of idleness for the core logic. In these embodiments, the controller monitors memory access activity in the electronic device and sets the switch so that the memory PHY voltage regulator provides electrical power to the core logic for the full power operating state when the memory access activity is above a rate threshold (e.g., N memory accesses in the last M milliseconds, etc.). On the other hand, the controller sets the switch so that the system voltage regulator provides electrical power to the core logic in one of the low power operating states when the memory access activity is below a rate threshold.

In some embodiments, with regard to the low power operating states, as long as memory access activity is below the rate threshold, but there is at least some memory access activity, the controller maintains the core logic in the memory PHY in the low activity operating state. In this case, the controller (or another entity in the electronic device) sets the system voltage regulator to provide electrical power to the core logic at the low activity voltage. When there is no memory access activity, however, the controller sets the core logic in one of the retention operating state or the power off operating state based on an idleness of the core logic. More specifically, the controller monitors periods for which the core logic is idle, i.e., not performing one or more specified activities such as processing interrupts, etc. When the core logic experiences an idle period that is shorter than a time threshold in length, the controller sets the system voltage regulator to provide electrical power to the core logic at the retention voltage in the retention operating state. When the core logic experiences an idle period that is longer than the time threshold in length, the controller sets the system voltage regulator to provide no electrical power to the core logic in the power off operating state. Note that, in some embodiments, using the power off operating state involves saving core logic operating state information (e.g., register values, etc.) to a memory (e.g., a state memory in the memory PHY) and then restoring the core logic operating state information from the memory to the core logic before commencing subsequent operation in an operating state other than the power off operating state.

In some embodiments, the controller includes one or more operating state change limiting mechanisms that limit a rate at which the controller switches the operating state for the core logic in the memory PHY. For example, the controller may maintain a record of prior operating state switches (e.g., from the full power operating state to the low activity operating state, etc.) and use the record to determine the rate at which operating states are being switched. The controller may limit some or all of the switches based on the record. For example, the controller may preferentially maintain the core logic in a higher electrical power operating state (rather than automatically switching the core logic to a lower electrical power operating state) when the operating state switching rate has been higher than a threshold value. As another example, the controller may use an average, maximum/minimum, or other value of memory access activity level and/or core logic idleness period length over some specified time rather than the instantaneous memory access activity level and/or core logic idleness period length for deciding whether to switch operating states for the core logic.

By using the full power and low power operating states for the core logic in the memory PHY, the described embodiments ensure that the core logic is in an appropriate operating state based on memory access activities and/or idle periods of the core logic. This helps to conserve electrical power when possible, but also ensures that the core logic—and thus the memory subsystem—is adequately responsive to memory access requests. By using the combination of the memory PHY voltage regulator and system voltage regulator for providing electrical power to the core logic in the respective full power and low power operating states, the described embodiments enable more efficient use of electrical power (e.g., lower dynamic power losses, etc.) in the electronic device. The electronic device therefore remains relatively responsive, but also avoids the unnecessary consumption of electrical power, which leads to higher user satisfaction with the electronic device.

Electronic Device

FIG. 1 presents a block diagram illustrating electronic device 100 in accordance with some embodiments. As can be seen in FIG. 1, electronic device 100 includes processing subsystem 102, graphics processing subsystem 104, display subsystem 106, media processing subsystem 108, memory subsystem 110, and fabric subsystem 114. Generally, processing subsystem 102, graphics processing subsystem 104, display subsystem 106, media processing subsystem 108, memory subsystem 110, networking subsystem 112, and fabric subsystem 114 are functional blocks that are implemented in hardware, i.e., using various circuitry, circuit elements, and devices. For example, processing subsystem 102, graphics processing subsystem 104, display subsystem 106, media processing subsystem 108, memory subsystem 110, networking subsystem 112, and fabric subsystem 114 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, at least some of processing subsystem 102, graphics processing subsystem 104, display subsystem 106, media processing subsystem 108, memory subsystem 110, networking subsystem 112, and fabric subsystem 114 perform operations associated with setting operating states for core logic in a memory physical layer (PHY) in memory subsystem 110.

Processing subsystem 102 is a functional block that performs computational and other operations (e.g., control operations, configuration operations, etc.) in electronic device 100. For example, processing subsystem 102 can be or include one or more microprocessors, central processing unit (CPU) cores, and/or other processing mechanisms.

Graphics processing subsystem 104 is a functional block that performs computational and other operations (e.g., control operations, configuration operations, etc.) associated with graphics processing (e.g., rendering, etc.) and/or general purpose computational operations in electronic device 100. For example, processing subsystem 102 can be or include one or more general purpose graphics processing unit (GPGPU) cores, and/or other graphics processing mechanisms.

Display subsystem 106 is a functional block that performs operations for displaying information on a display (e.g., a display screen) for electronic device 100 (not shown). Display subsystem 106 includes one or more controllers, drivers, and/or other circuitry for providing information to a display and/or receiving information from the display.

Media processing subsystem 108 is a functional block that performs operations for processing audio media (e.g., audio files, audio streams, etc.), video media (e.g., video files, video streams, etc.), haptic, and/or other forms of media for storage in a memory (e.g., in memory subsystem 110) or streaming via a network and/or output via speakers, the display, and/or other human interface devices. Media processing subsystem 108 includes one or more receivers, processors, encoders/decoders, controllers, drivers, and/or other circuitry for processing media.

Memory subsystem 110 is functional block that performs operations of a memory (e.g., a "main" memory). Memory subsystem 110 includes volatile and/or non-volatile memory circuits such as fourth-generation double data rate synchronous DRAM (DDR4 SDRAM) and/or other types of memory circuits for storing data and instructions for use by other functional blocks in electronic device 100 and control circuits for handling accesses of the data and instructions that are stored in the memory circuits and for performing other control or configuration operations. As described below, in the described embodiments, memory subsystem includes a memory physical layer (PHY) having core logic circuitry that can be operated in a number of different operating states.

Networking subsystem 112 is a functional block that performs operations for searching for, connecting to, configuring, and communicating on a wired and/or wireless electronic communications network. Networking subsystem 112 includes transceivers, controllers, processors, and/or other circuitry for communicating on the wired and/or wireless network.

Electronic device 100 is simplified for illustrative purposes. In some embodiments, however, electronic device 100 includes additional or different functional blocks, subsystems, elements, and/or communication paths. For example, electronic device 100 may include input-output (I/O) subsystems, etc. Electronic device 100 generally includes sufficient functional blocks to perform the operations herein described.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Voltage Regulators

Figure 2:
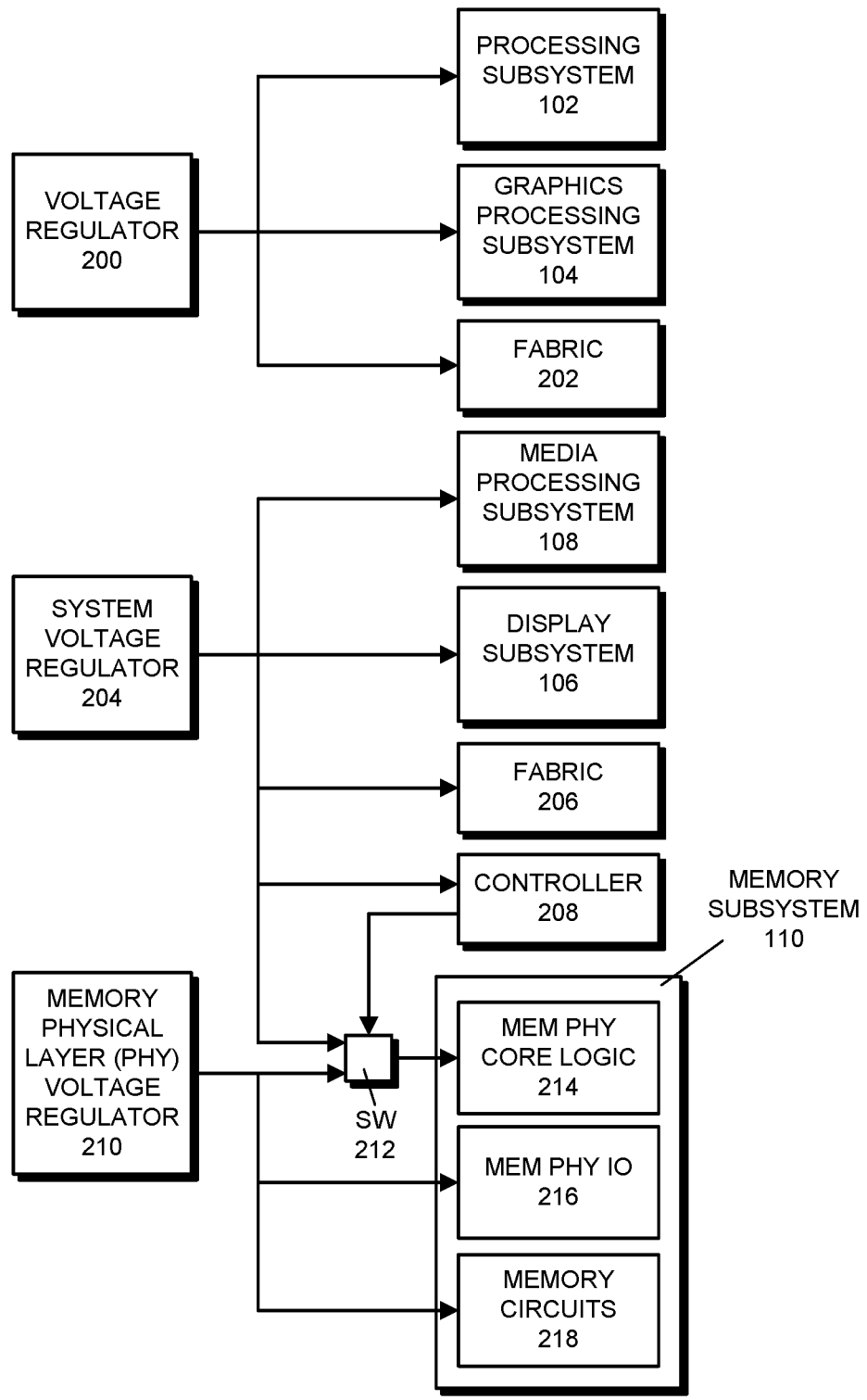
FIG. 2 presents a block diagram illustrating voltage regulators in an electronic device in accordance with some embodiments.

In the described embodiments, electronic device 100 includes a set of voltage regulators, each of which provides electrical power to respective functional blocks in electronic device 100. FIG. 2 presents a block diagram illustrating voltage regulators in electronic device 100 in accordance with some embodiments. As can be seen in FIG. 2, the voltage regulators include voltage regulator 200, system voltage regulator 204, and memory physical layer (PHY) voltage regulator 210 (collectively, "the voltage regulators"). Each of the voltage regulators includes voltage regulator circuitry such as a switching voltage regulator or another type of voltage regulator. For example, in some embodiments, some or all of the voltage regulators are or include one or more buck converters or boost converters. Each voltage regulator receives an input voltage, e.g., from an electrical power rail in electronic device 100 or another source (not shown), and provides electrical power at a regulated voltage.

In the described embodiments, the particular regulated voltage for electrical power provided by each of the voltage regulators is set using circuit elements in that voltage regulator. The circuit elements that are used for controlling the output of each voltage regulator depend on the type of that voltage regulator—and thus the circuit elements present therein. For example, in some embodiments, a bias or reference voltage supplied to circuit elements of a given voltage regulator can be set to specified values to cause those circuit elements to commence providing electrical power at a respective voltages. As another example, in some embodiments, amplifiers, resistors, capacitors, inductors, etc. in a given voltage regulator can be configured or set to cause the given voltage regulator to commence providing electrical power at a specified voltage. As another example, in some embodiments, a value in a register or memory element that is used by one or more control circuits or elements for a given voltage regulator to determine how to set the output voltage for the given voltage regulator can be set to specified values to cause the given voltage regulator to commence providing electrical power at a specified voltage.

In some embodiments, each of the voltage regulators provides electrical power to a specified "domain" that includes a respective separate subset of the functional blocks in electronic device 100. For example, voltage regulator 200 provides electrical power to a domain that includes processing subsystem 102, graphics processing subsystem 104, and a portion of fabric subsystem 114 (shown as fabric 202 in FIG. 2) (e.g., for a particular bus, driver or receiver circuitry on a communication interconnect used by the processing subsystems, etc.). In some embodiments, the domains, and thus the functional blocks included therein, are arranged so that the constituent functional blocks can be operated as a group in various operating states. For example, in some embodiments, system voltage regulator 204 provides electrical power to a domain that includes functional blocks that are typically at least partially active even in low power operating states of electronic device—when other voltage regulators, such as voltage regulator 200, are providing electrical power at significantly reduced voltages or are providing no electrical power. For instance, media processing subsystem 108, display subsystem 106, and a portion of fabric subsystem 114 (shown as fabric 206 in FIG. 2) may be in a low power, but still active, operating state for use in decoding and viewing video media on a display of the electronic device while processing subsystem 102 and graphics processing subsystem 104 are in a low voltage retention operating state or are electrically powered down. In some of these embodiments, the electrical power domain to which system voltage regulator 204 provides electrical power is called the "stutter" domain because the functional blocks therein may be switched between on and off states, or "stuttered," as needed for performing corresponding operations in certain low power modes (e.g., displaying information on a display of electronic device 100, etc.).

As shown in FIG. 2, memory subsystem 110 includes memory physical layer (MEM PHY) core logic 214, memory physical layer (MEM PHY) input-output (10) 216, and memory circuits 218. Memory circuits 218 is a functional block that includes memory circuitry that is used for storing copies of data for accesses (e.g., reads, writes, deletions, modifications, etc.) by other functional blocks in electronic device 100 and circuitry for accessing data in the memory circuitry. For example, memory circuits 218 may include an array of DDR4 SDRAM circuits with capacity for storing gigabytes or terabytes of data. Memory PHY IO 216 is a functional block that performs operations for sending data acquired from memory circuits 218 to other functional blocks in electronic device 100 (e.g., processing subsystem 102, etc.) and for receiving, from other functional blocks in electronic device 100, data to be stored in memory circuits 218. Memory PHY IO 216 includes circuitry such as drivers, receivers, buffers, etc. that are used for sending and receiving data. Memory PHY core logic 214 is a functional block that includes circuitry for managing accesses of memory circuits 218 as well as controlling other operations in memory subsystem 110. Memory PHY core logic 214 includes circuitry such as memory access state machine circuitry, memory access routing controller circuitry, memory PHY clock generation circuitry, and memory PHY state information storage memory circuitry.

Memory PHY IO 216 and memory circuits 218 are provided electrical power by memory PHY voltage regulator 210 (regardless of an operating state of memory PHY core logic 214). In some embodiments, memory PHY voltage regulator 210 provides electrical power at a fixed and substantially steady voltage that is sufficiently high to enable reliable operation of circuitry in memory PHY IO 216 and memory circuits 218.

Memory PHY core logic 214 is provided electrical power from either system voltage regulator 204 or memory PHY voltage regulator 210 via switch (SW) 212. Switch 212 is a two-input one-output switch (e.g., a multiplexer) that is controlled by controller 208 to selectively provide electrical power from one of system voltage regulator 204 or memory PHY voltage regulator 210 in accordance with an operating state for memory PHY core logic 214. One of switch 212's inputs is coupled to an electrical power output of memory PHY voltage regulator 210, the other of switch 212's inputs is coupled to an electrical power output of system voltage regulator 204, and switch 212's output is coupled to a power supply input of memory PHY core logic 214. For a full power operating state, controller 208 sets switch 212, via a switch control input of switch 212, so that memory PHY voltage regulator 210 provides electrical power to the core logic. For low activity, retention, and power off operating states, controller 208 sets switch 212 so that system voltage regulator 204 provides electrical power to memory PHY core logic 214. The function of switch 212 and the full power, low activity, retention, and power off operating states are described in more detail below.

In this description, the voltage regulators are described as "providing electrical power" at specified voltages (e.g., full power voltage, low activity voltage, etc.). "Providing electrical power" as used herein involves providing an electrical current sufficient to satisfy the demand of an electrical load (e.g., circuitry, functional blocks, etc.) at a substantially steady regulated voltage. "Substantially steady" voltages are voltages that are, to the extent possible, maintained by voltage regulators at a desired regulated voltage, but that may vary according to changing electrical power demands from electrical loads, etc.

Although a particular number and arrangement of voltage regulators is shown in FIG. 2, in some embodiments, electronic device 100 includes a different number and/or arrangement of voltage regulators. For example, in some embodiments, electronic device 100 includes additional voltage regulators for providing electrical power to functional blocks not shown in FIG. 2 such as networking subsystem 112. Generally, electronic device 100 includes sufficient voltage regulators to perform the operations herein described.

Controller and Memory PHY Core Logic

Figure 3:
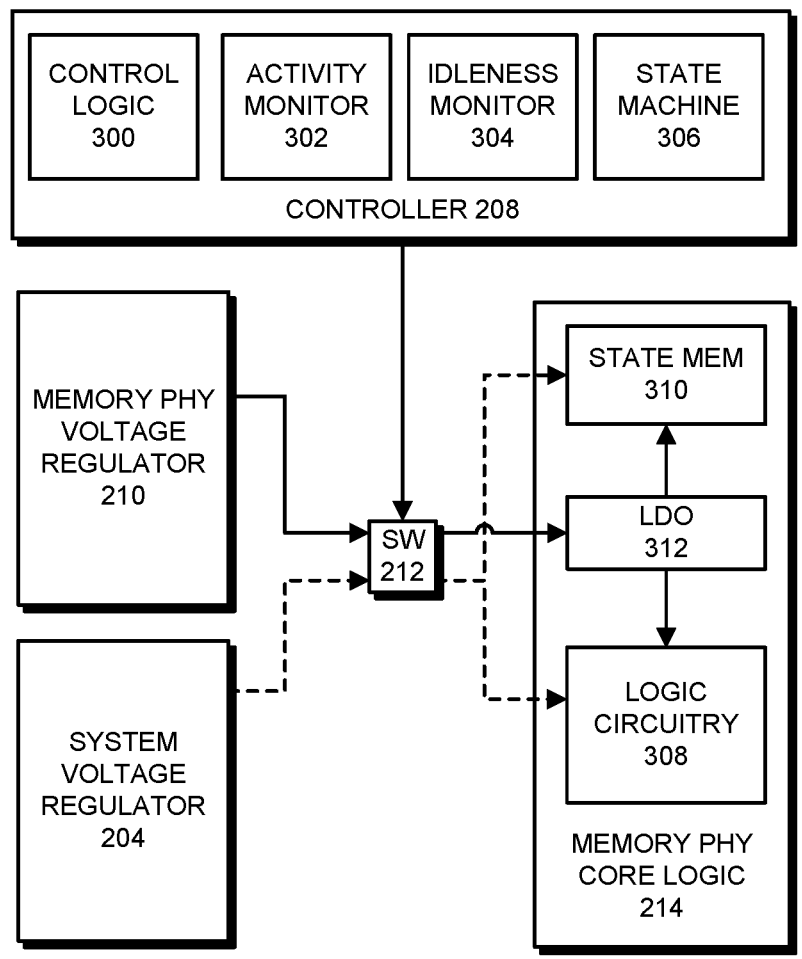
FIG. 3 presents a block diagram illustrating a controller, a switch, and memory physical layer (PHY) core logic in accordance with some embodiments.

In the described embodiments, a controller configures a switch so that a desired voltage regulator provides electrical power to core logic circuitry in a memory PHY via the switch. FIG. 3 presents a block diagram illustrating controller 208, switch 212, and memory PHY core logic 214 in accordance with some embodiments. As can be seen in FIG. 3, controller 208 includes control logic 300, activity monitor 302, idleness monitor 304, and state machine 306. Control logic 300 is a functional block that performs operations for controlling switch 212 using state machine 306 based on inputs received from activity monitor 302 and idleness monitor 304. Control logic 300 drives a signal to switch 212 that causes switch 212 to forward electrical power received from one of system voltage regulator 204 or memory PHY voltage regulator 210 to memory PHY core logic 214. For example, in embodiments where switch 212 is a multiplexer, control logic 300 controls switch 212 via the logical high/low level of a multiplexer control signal. As another example, in embodiments where switch 212 is part of other circuitry, control logic 300 can communicate one or more values (e.g., bit sequences, signal levels or edges, etc.) that cause the other circuitry to set switch 212 accordingly.

Activity monitor 302 is a functional block that performs operations for determining a rate at which memory accesses are occurring or are to occur in memory circuits 218 and reporting the rate of memory accesses to control logic 300. For example, in some embodiments, based on information about memory access operations that were, are being, or are to be performed by memory PHY core logic 214 that are received or acquired from memory PHY core logic 214, activity monitor 302 determines the rate of memory accesses. As another example, in some embodiments, based on information about queue depth, software or hardware workload profiles, estimated memory access rates, and/or other information received from other functional blocks in electronic device 100 (e.g., processing subsystem 102, etc.) activity monitor 302 determines the memory access rates. In some embodiments, activity monitor 302 keeps a record of past memory access rates and/or a running average of memory access rates over one or more time periods and uses the record to assist in determining or estimating the memory access rates.

Idleness monitor 304 is a functional block that performs operations for determining the length of periods of idleness being experienced or to be experienced by memory PHY core logic 214 and reporting the lengths to control logic 300. In other words, idleness monitor 304 determines the actual or estimated lengths of time during which memory PHY core logic 214 is idle (i.e., not involved in memory access, control, interrupt processing, and/or other operations) and then provides a representation of the actual or estimated lengths of time to control logic 300. For example, in some embodiments, based on information that is acquired from memory PHY core logic 214 about operations that were, are being, or are to be performed by memory PHY core logic 214, idleness monitor 304 determines the length or estimated length of idle periods for memory PHY core logic 214. As another example, in some embodiments, based on information about queue depth, software or hardware workload profiles, future memory access operations, and/or other information received from other functional blocks in electronic device 100 (e.g., processing subsystem 102, etc.) idleness monitor 304 determines the length or estimated length of idle periods for memory PHY core logic 214. In some embodiments, idleness monitor 304 keeps a record of past idle periods for memory PHY core logic 214 and/or a running average of a length of the past idle periods for memory PHY core logic 214 and uses the record to assist in determining or estimating the length of a given idle period.

Figure 4:
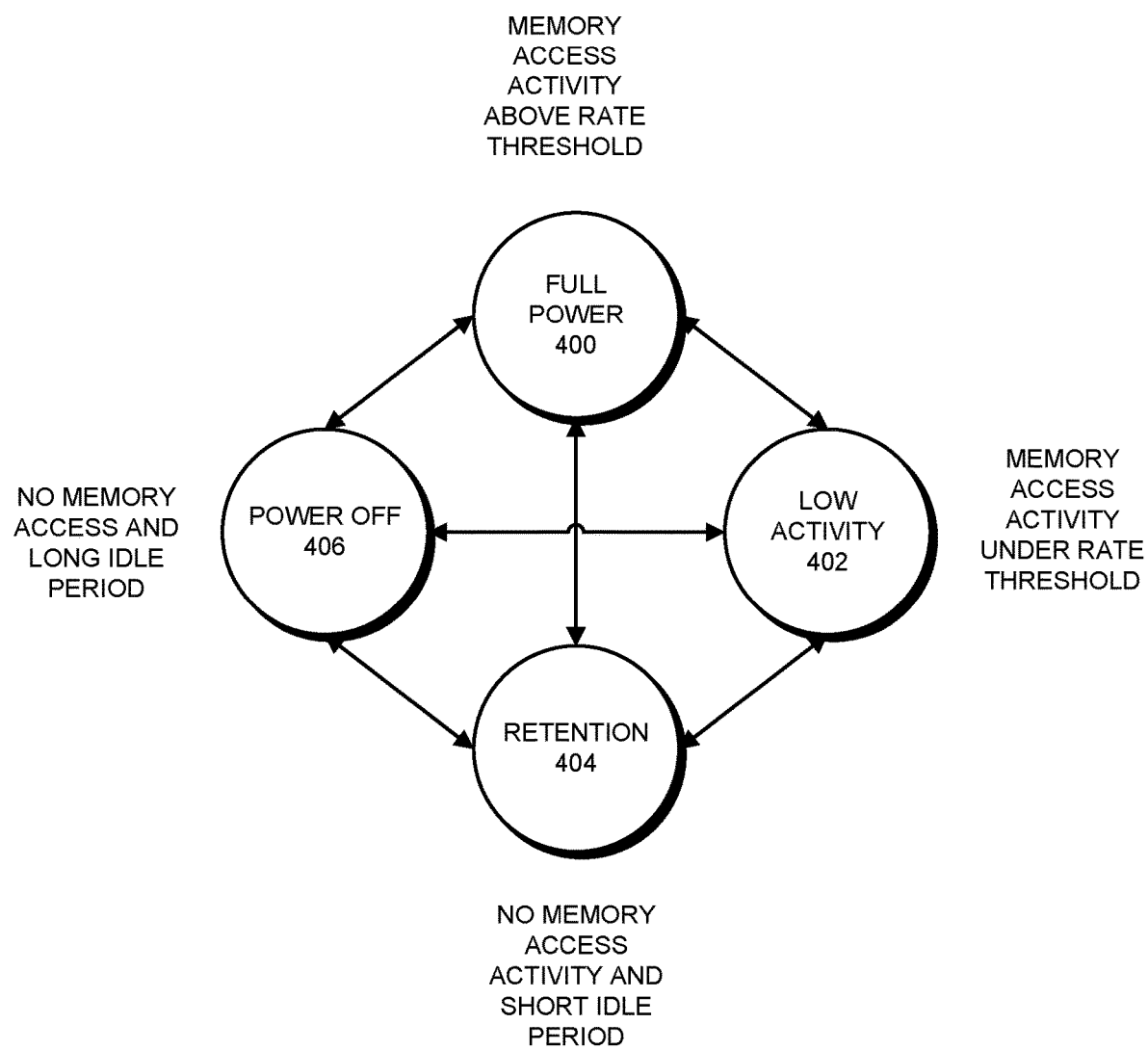
FIG. 4 presents a state diagram illustrating a number of operating states and transitions between the operating states in accordance with some embodiments.

State machine 306 is a functional block that performs operations for determining an operating state to be used for memory PHY core logic 214 based on the rate of memory accesses and/or the length of idle periods for memory PHY core logic 214. State machine 306 includes circuitry storing or otherwise representing states and transitions between the states for memory PHY core logic 214. In operation, state machine 306 receives information about the rate of memory accesses and/or the length of idle periods for memory PHY core logic 214 and returns, based on the received information, an indication of an operating state in which memory PHY core logic 214 is to be operated. States and transitions between the states for the state machine are shown in FIG. 4 and described below.

In some embodiments, state machine 306, control logic 300, and/or another functional block includes operating state change limiting mechanisms that limit a rate at which control logic 300 switches the operating state for the core logic in the memory PHY. For example, in some embodiments, the operating state change limiting mechanisms include one or more counters in which is kept a time since a last transition was made between two or more respective operating states. In these embodiments, the one or more counters are used for ensuring that a particular amount of time has passed before a subsequent transition is made between the respective two or more operating states. In some of these embodiments, the particular amount of time is associated with or proportional to the latency for transitioning between two or more operating states, with longer particular amounts of times for operating states with higher transition latency. As another example, in some embodiments, the operating state change limiting mechanisms include one or more records of the running average of times between transitions between two or more respective operating states, one or more records of the average number of operating state transitions between two or more respective operating states in a given time period, and/or other records that represents a rate of transitions between operating states. In these embodiments, the one or more records are used for controlling the rate at which transitions are made between operating states. Generally, the operating state change limiting mechanisms prevent excessive transitions back and forth between two or more of the operating states in order to avoid inconsistent operation (caused by rapidly switching between two or more operating states) and unnecessary effort in performing the transitions between the two or more operating states. In some embodiments, the operating state change limiting mechanisms preferentially keep the memory PHY core logic 214 in a higher electrical power operating state (e.g., the full power operating state, the low activity operating state, etc.), rather than allowing the memory PHY core logic 214 to rapidly bounce back and forth from the higher power operating state to a lower electrical power operating state (e.g., the low activity operating state, the retention operating state, etc.).

Memory PHY core logic 214 includes logic circuitry 308, state memory (MEM) 310, and low dropout regulator (LDO)

312. Logic circuitry 308 is a functional block that performs operations for controlling, configuring, and operating memory PHY core logic 214. For example, in some embodiments, logic circuitry 308 includes memory access state machine circuitry used for controlling accesses of memory circuits 218, memory access routing controller circuitry used for routing memory accesses to/from memory circuits 218, memory PHY clock generation circuitry used for generating one or more clocks used for memory accesses in memory circuits 218 and/or operations in memory PHY core logic 214, and/or other circuitry.

State memory 310 is a functional block that performs operations for storing operating state information from circuitry in memory PHY core logic 214. State memory 310 includes memory such as static random access memory (SRAM) that is used by logic circuitry 308 for storing operating state information such as the content of registers, configuration bits/flags, settings, operational values (results, inputs, etc.), and/or other state information that is used by memory PHY core logic 214 or functional blocks therein during operation. In some embodiments, operating state information is read, received, or otherwise acquired from the circuitry in memory PHY core logic 214 prior to entering a low power operating state in which electrical power is provided to memory PHY core logic 214 at a sufficiently low voltage that the operating state information will not be reliably retained in the circuitry in memory PHY core logic 214 (e.g., the retention operating state, etc.). The state is then stored in state memory 310 until the circuitry in memory PHY core logic 214 is restored to a higher power operating state in which electrical power is provided to memory PHY core logic 214 at a sufficiently high voltage that the operating state information will be reliably retained in the circuitry in memory PHY core logic 214 (e.g., the full power operating state, etc.). As the circuitry in the memory PHY core logic 214 is transitioned from the low power operating state to the higher power operating state, the operating state information is read from state memory 310 and used for restoring the operating state of the circuitry in memory PHY core logic 214 to an operating state from before the transition to the low power operating state. In some embodiments, there is a delay or latency associated with acquiring and storing the operating state information in state memory 310 and a delay or latency associated with reading the operating state information from state memory 310 and using the operating state information for restoring the operating state of the circuitry in memory PHY core logic 214.

LDO 312 is a voltage regulator such as a low dropout regulator, a linear voltage regulator, or another type of voltage regulator. LDO 312 provides electrical power to logic circuitry 308 and state memory 310. More specifically, LDO 312 receives electrical power from memory PHY voltage regulator 210, which provides electrical power at voltage that is sufficiently high to enable reliable operation of circuitry in memory PHY IO 216 and memory circuits 218. LDO 312 reduces (or otherwise regulates) the voltage provided from memory PHY voltage regulator 210 to a voltage level that is to be used in logic circuitry 308 and state memory 310. In some embodiments, LDO 312 includes circuit elements such as decoupling capacitors, etc. that reduce the effects of undesired voltage fluctuations such as transients and noise.

In some embodiments, LDO 312 only provides electrical power to logic circuitry 308 and state memory 310 in certain operating states—and system voltage regulator 204 provides electrical power to logic circuitry 308 and state memory 310 in other operating states. In these embodiments, controller 208 uses switch 212 to control which voltage regulator, from among memory PHY voltage regulator 210 and system voltage regulator 204, provides electrical power to logic circuitry 308 and state memory 310. For example, in some embodiments, controller 208 sets switch 212 so that memory PHY voltage regulator 210 provides electrical power—via switch 212 and LDO 312—to logic circuitry 308 and state memory 310 only in the full power operating state. In these embodiments, controller 208 sets switch 212 so that system voltage regulator 204 provides electrical power to logic circuitry 308 and state memory 310 in the low power operating states (e.g., the low activity operating state, etc.).

In some embodiments, LDO 312 is bypassed and possibly powered down when not being used for regulating voltage in the full power operating state. This is seen in FIG. 3 via the dashed line (which is dashed for clarity) proceeding from system voltage regulator 204 to logic circuitry 308 and state memory 310 without involving LDO 312. The dashed line shows the approximate route of electrical power flow in the lower power operating states. As can be seen from the dashed line, system voltage regulator 204 more directly provides electrical power to logic circuitry 308 and state memory 310 than memory PHY voltage regulator 210. In contrast, the solid line shows the approximate route of electrical power flow in the full power operating state—from memory PHY voltage regulator 210, through switch 212, to LDO 312, and then to logic circuitry 308 and state memory 310. By bypassing and possibly powering down LDO 312, these embodiments can avoid unnecessary electrical power loss in LDO 312 when LDO 312 is not being used for providing electrical power to logic circuitry 308 and state memory 310.

In some embodiments, some or all of the circuitry for controller 208 is located physically closely to switch 212 and/or memory PHY core logic 214. For example, circuitry such as control logic 300 and state machine 306 can be located on a same region or area of an integrated circuit chip as switch 212 and/or memory PHY core logic 214. In these embodiments, therefore, controller 208 is able to respond, and thus cause transitions between operating states, relatively rapidly. When combined with the use of the retention operating state, in which operating state is maintained in logic circuitry 308, this ability to relatively rapidly transition between operating states means that low power operating states can be used more often and for shorter periods of time. This is true because the latency of entering and exiting low power states is lower given the proximity of the circuitry in controller 208 and the retained state information in logic circuitry 308.

State Machine

FIG. 4 presents a state diagram illustrating a number of operating states and transitions between the operating states in a state machine in accordance with some embodiments. In some embodiments, memory PHY core logic 214 is operated in a selected one of the operating states at a time. In these embodiments, controller 208 uses the state machine to transition memory PHY core logic 214 between the operating states (so that the memory PHY core logic 214 is in one of the operating states) based on criteria associated therewith.

As can be seen in FIG. 4, the operating states include the full power 400, low activity 402, retention 404, and power off 406 operating states (collectively, "the operating states"). For the full power 400 operating state, electrical power is provided to memory PHY core logic 214 from memory PHY voltage regulator 210 via switch 212 and LDO 312 at a full power voltage (e.g., 0.6 V or another voltage). The full power voltage is a voltage at which memory PHY core logic 214 operates typically or normally and without reductions in performance associated with a lower voltage level. In other words, the full power voltage is sufficiently high that memory PHY core logic 214 is operating at a specified full speed (which may not be the fastest possible operating speed) and is not hampered in operation by a lack of voltage. In some embodiments, controller 208 places and maintains memory PHY core logic 214 in the full power 400 operating state (i.e., keeps switch 212 set accordingly) as long as a rate of memory access activity is above a rate threshold. For example, the rate threshold may be N memory accesses in M milliseconds, where N and M are specified numbers.

For the low activity 402 operating state, electrical power is provided to memory PHY core logic 214 from system voltage regulator 204 via switch 212 at a low activity voltage. The low activity voltage is lower than the full power voltage (e.g., 0.5 V or another voltage). The low activity voltage is sufficient for circuitry in the memory PHY core logic to continue limited operation—but is low enough that the memory PHY core logic experiences a corresponding reduction in performance. For example, the memory PHY core logic may perform operations more slowly at the low activity voltage than with the full power voltage. In some embodiments, controller 208 places and maintains memory PHY core logic 214 in the low activity 402 operating state when the rate of memory access activity is below the rate threshold, but there is at least some memory access activity.

For the retention 404 operating state, electrical power is provided to memory PHY core logic 214 from system voltage regulator 204 via switch 212 at a retention voltage. The retention voltage is lower than the low activity voltage (e.g., 0.4 V or another voltage). The retention voltage is low enough to be insufficient for circuitry (e.g., logic circuitry 308, etc.) in memory PHY core logic 214 to continue reliable operation, but is sufficient to retain state information for the circuitry in memory PHY core logic 214. For example, at the retention voltage, registers, memory elements, etc. in memory PHY core logic 214 that are used for storing register values, configuration bits/flags, settings, operational values (results, inputs, etc.), and/or other state information may continue to reliably store these values. In some embodiments, controller 208 places and maintains memory PHY core logic 214 in the retention 404 operating state when there are no memory accesses being performed and memory PHY core logic 214 is experiencing a short idle period (e.g., an idle period shorter than a time threshold T).

For the power off 406 operating state, no electrical power is provided to memory PHY core logic 214 from system voltage regulator 204. In the power off operating state, due to the lack of electrical power, the memory PHY core logic 214 is shut down or powered off and is not performing any operations. In addition, and unlike in the retention 404 operating state, memory PHY core logic 214 does not retain operating state information. Instead, before entering the power off 406 operating state, the operating state information is copied to state memory 310, where the operating state information is held until being used to restore the operating state of memory PHY core logic 214 upon transition to another operating state from the power off 406 operating state. In some embodiments, controller 208 places and maintains memory PHY core logic 214 in the power off 406 operating state when there are no memory accesses being performed and memory PHY core logic 214 is experiencing a long idle period (e.g., an idle period longer than a time threshold T).

As illustrated by the arrows in FIG. 4, in some embodiments, the controller can transition the memory PHY core logic from any operating state to any other operating state. For example, the controller can transition the memory PHY core logic from the full power 400 operating state to the low activity 402, retention 404, or power off 406 operating states and vice versa. In these embodiments, controller 208 transitions memory PHY core logic 214 between the states based on the rate of memory accesses and/or the length of idle periods. In some embodiments, however, a specified sequence of transitions is performed. For example, in some of these embodiments, the sequence of transitions is full power 400, low activity 402, retention 404, and power off 406, in that order—and reverse order. Generally, in the described embodiments, the controller is able to transition the memory PHY core logic between at least some of the operating states based on the rate of memory accesses and/or the length of idle periods.

Although embodiments are described above in which memory PHY core logic 214 alone is provided electrical power at various voltages in respective operating states, in some embodiments, one or more other functional blocks in electronic device 100 are provided electrical power at the same voltages from system voltage regulator 204 in some or all of the operating states. For example, in some embodiments, system voltage regulator 204 provides electrical power at the low activity voltage, the retention voltage, and/or does not provide electrical power (in the power off 406 operating state) to display subsystem 106, media processing subsystem 108, etc. In these embodiments, therefore, memory PHY core logic 214 is in a "same" low power state as other functional blocks in an electrical power domain supplied by system voltage regulator 204.

Although a number of operating states are shown in FIG. 4, in some embodiments, a different number or arrangement of operating states, criteria for transitioning to/from operating states, and/or voltage regulators are used. For example, in some embodiments, memory PHY voltage regulator 210 provides electrical power to memory PHY core logic 214 in one or more low power operating states at corresponding reduced voltages (not shown). Generally, in the described embodiments, any number of operating states can be used, given that at least some of the operating states are the operating states described herein.

Figure 5:
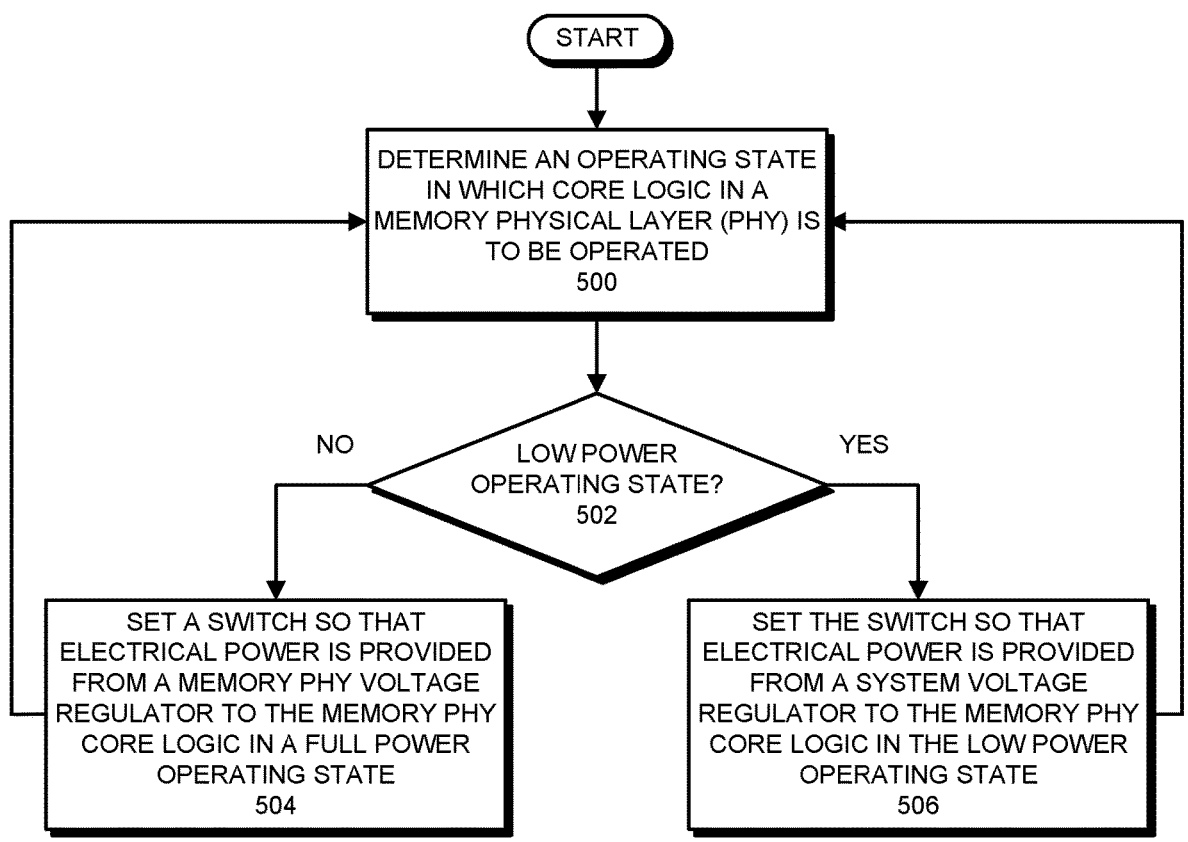
FIG. 5 presents a flowchart illustrating a process for setting an operating state in memory PHY core logic in accordance with some embodiments.

Processes for Setting Operating States for Memory Physical Layer (PHY) Core Logic In the described embodiments, a controller (e.g., controller 208) controls an operating state for memory PHY core logic (e.g., memory PHY core logic 214) and therefore controls a voltage at which electrical power is provided to the memory PHY core logic. FIG. 5 presents a flowchart illustrating a process for setting an operating state for the memory PHY core logic in accordance with some embodiments. Note that the operations shown in FIG. 5 are presented as a general example of operations performed by some embodiments. The operations performed by other embodiments include different operations, operations that are performed in a different order, and/or operations that are performed by different functional blocks.

The process in FIG. 5 starts when a controller determines an electrical power operating state in which the memory PHY core logic is to be operated (step 500). For this operation, the controller keeps track of a rate at which memory accesses are being performed and/or a length of idle periods for the memory PHY core logic and uses the rate at which the memory accesses are being performed and/or the length of the idle periods to determine the operating state in which the memory PHY core logic is to be operated. In some embodiments, the controller uses state machine circuitry (e.g., state machine 306) to determine the operating state in which the memory PHY core logic is to be operated. The determining operation is described in more detail below for FIG. 6.

When the memory PHY core logic is not to be operated in a low power operating state (step 502), the controller sets a switch (e.g., switch 212) so that electrical power is provided from a memory PHY voltage regulator (e.g., memory PHY voltage regulator 210) to the memory PHY core logic in a full power operating state (step 504). For this operation, the controller configures, via the switch, the path through which electrical power flows to the memory PHY core logic so that the electrical power is sourced from the memory PHY voltage regulator, passes through the switch to a local LDO in the memory PHY core logic (e.g., LDO 312), and is provided from the LDO to circuitry in the memory PHY core logic (e.g., logic circuitry 308, etc.).

When the memory PHY core logic is to be operated in a low power operating state (step 502), the controller sets a switch (e.g., switch 212) so that electrical power is provided from a system voltage regulator (e.g., system voltage regulator 204) to the memory PHY core logic in the low power operating state (step 506). For this operation, the controller configures, via the switch, the path through which electrical power flows to the memory PHY core logic so that the electrical power is sourced from the system voltage regulator and passes through the switch to circuitry in the memory PHY core logic (e.g., logic circuitry 308, etc.). As described above, in some embodiments, the LDO is bypassed and possibly powered down in the low power operating states.

Figure 6:
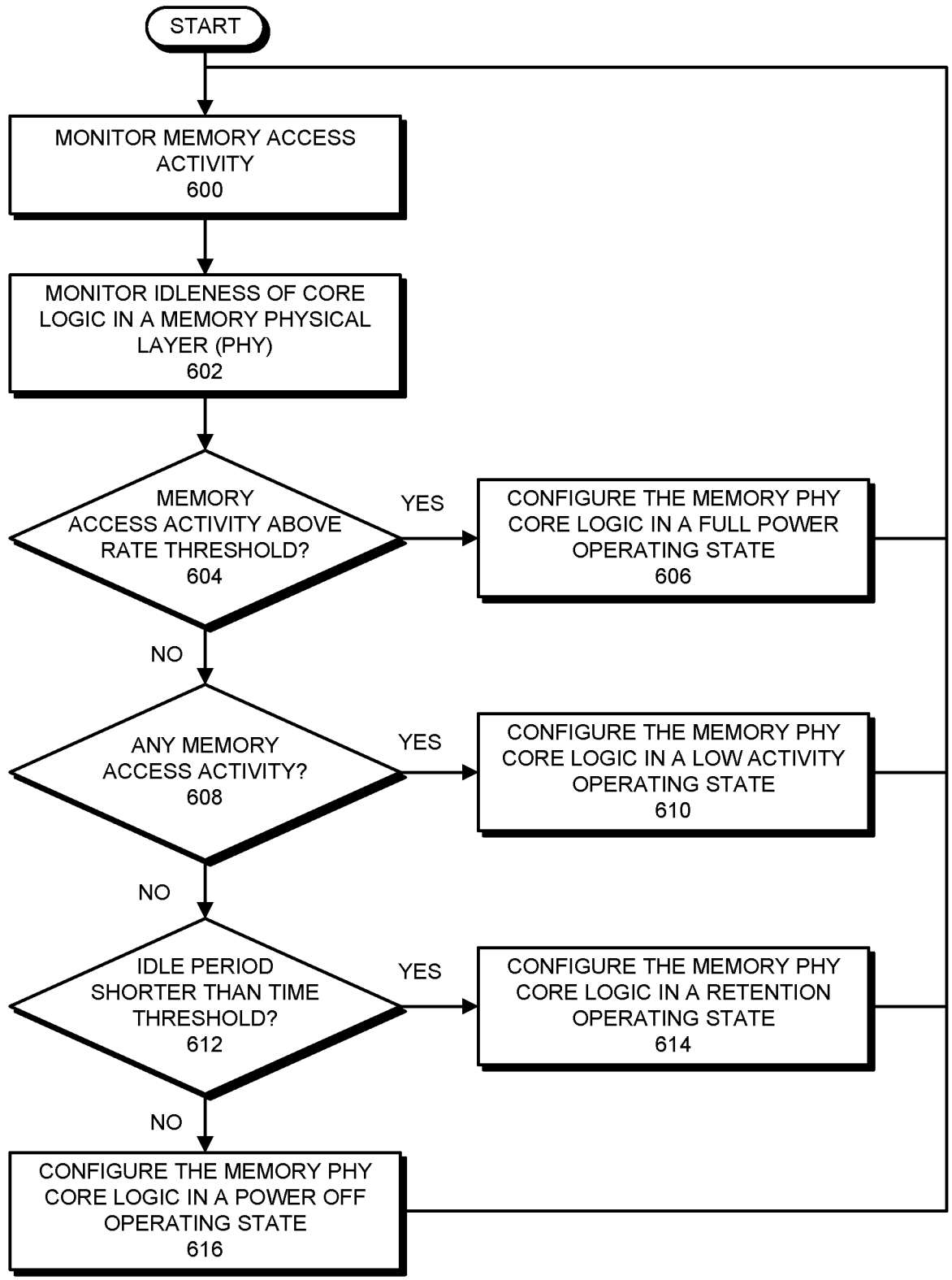
FIG. 6 presents a flowchart illustrating a process for determining an operating state in which memory PHY core logic is to be operated in accordance with some embodiments.

FIG. 6 presents a flowchart illustrating a process for determining an operating state in which memory PHY core logic is to be operated in accordance with some embodiments. In some embodiments, the operations in FIG. 6 are performed as part of step 500, although this is not a requirement. Note that the operations shown in FIG. 6 are presented as a general example of operations performed by some embodiments. The operations performed by other embodiments include different operations, operations that are performed in a different order, and/or operations that are performed by different functional blocks.

The process in FIG. 6 starts when a controller (e.g., controller 208) monitors memory access activity in a memory subsystem (memory subsystem 110) (step 600). For this operation, the controller determines a rate at which memory accesses are happening in the memory subsystem based on information received from an activity monitor (e.g., activity monitor 302) and/or another functional block. For example, the activity monitor can periodically supply, to the controller, information indicating a number of memory accesses in the last second, an average percentage of all the available time for performing memory accesses that is employed in performing memory accesses, etc. The controller also monitors an idleness of core logic in a memory PHY (e.g., memory PHY core logic 214) (step 602). For this operation, the controller determines a length of one or more idle periods during which the memory PHY core logic is idle based on information received from an idle monitor (e.g., idleness monitor 304) and/or another functional block. For example, the idleness monitor can periodically supply, to the controller, information indicating a length of a specified idle period, an average length of two or more idle periods, an average percentage of all the available time for performing operations in the memory PHY core logic that is employed in performing operations, etc.

When the rate of memory accesses is above a rate threshold (step 604), the controller configures the memory PHY core logic in a full power operating state (step 606). For this operation, when the memory subsystem is sufficiently busy performing memory accesses, the controller maintains the memory PHY core logic in the full power operating state in which electrical power is provided to the memory PHY core logic by a memory PHY voltage regulator (e.g., memory PHY voltage regulator 210) via a local LDO (e.g., LDO 312) at a full power voltage. In the full power operating state, the memory PHY core logic is normally or typically responsive to memory access requests and for performing other operations.

When the rate of memory accesses is below a rate threshold (step 604), but there is memory access activity (step 608), the controller configures the memory PHY core logic in a low activity operating state (step 610). For this operation, when the memory subsystem is not as busy performing memory accesses, but is performing at least some memory accesses, the controller keeps the memory PHY core logic in the low activity operating state in which electrical power is provided to the memory PHY core logic by a system voltage regulator (e.g., system voltage regulator 204) at a low activity voltage. In some embodiments, the operating speed of the memory PHY core logic is lower in the low activity operating state than in the full power operating state due to a difference between the low activity voltage and the full power voltage. In the low activity operating state, therefore, the memory PHY core logic is slower in responding to memory access requests and performing other operations, but also conserves electrical power.

When there is no memory access activity (step 608) and the memory PHY core logic is experiencing an idle period that is shorter than a time threshold (step 612), the controller configures the memory PHY core logic in a retention operating state (step 614). For this operation, when the memory subsystem performing no memory accesses and the core logic is experiencing a relatively short idle period, the controller keeps the memory PHY core logic in the retention operating state in which electrical power is provided to the memory PHY core logic at a retention voltage. In the retention operating state, although the memory PHY core logic is unable to reliably perform operations due to the lowness of the retention voltage, the retention voltage is sufficiently high that operating state information can be maintained in the memory PHY core logic. Keeping the operating state information stored in the memory PHY core logic (instead of preserving the operating state information in a state memory) enables the more rapid recovery from the retention operating state to higher powered operating states (i.e., the low activity operating state, the full power operating state, etc.).

When there is no memory access activity (step 608) and the memory PHY core logic is experiencing an idle period that is longer than a time threshold (step 612), the controller configures the memory PHY core logic in a power off operating state (step 616). For this operation, when the memory subsystem is performing no memory accesses and the core logic is experiencing a relatively long idle period, the controller powers down the memory PHY core logic so that no electrical power is provided to the memory PHY core logic. In the power off operating state, the memory PHY core logic is unable to perform operations. In some embodiments, entering the power off operating state involves preserving operating state information for the memory PHY core logic. For example, the operating state information can be acquired from the memory PHY core logic and stored in a state memory (e.g., state memory 310) and/or another memory (e.g., a memory in memory subsystem 110, etc.).

In some embodiments, at least one electronic device (e.g., electronic device 100) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, neural network processors, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), perform the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
    a memory functional block that includes a plurality of memory circuits and a memory physical layer (PHY) functional block, the memory PHY functional block including core logic that controls operations of the memory PHY functional block;
    a memory PHY voltage regulator;
    a system voltage regulator;
    a switch having a first input coupled to an output of the memory PHY voltage regulator, a second input coupled to an output of the system voltage regulator, and an output coupled to a power supply input of the core logic; and
    a controller coupled to the switch and configured to:
        set the switch so that electrical power is provided from the memory PHY voltage regulator to the core logic in a full power operating state; and
        set the switch so that electrical power is provided from the system voltage regulator to the core logic in each of multiple low power operating states.

2. The electronic device of claim 1, wherein the multiple low power operating states include:
    a low activity operating state in which the system voltage regulator provides electrical power to the core logic at a reduced voltage, wherein the reduced voltage is lower than a full operating voltage of circuitry in the core logic, but is sufficient for the circuitry in the core logic to continue limited operation;
    a retention operating state in which the system voltage regulator provides electrical power to the core logic at a retention voltage, wherein the retention voltage is lower than the reduced voltage and is not sufficient for the circuitry in the core logic to reliably continue the limited operation, but is sufficient to retain state information for the circuitry in the core logic; and a power off operating state in which the system voltage regulator provides no electrical power to the core logic.

3. The electronic device of claim 2, wherein the controller is further configured to:

determine a rate of memory access activities in the memory functional block;

when the rate of memory access activities is above a rate threshold, configure the core logic in the full power operating state, the configuring including setting the switch so that electrical power is provided from the memory PHY voltage regulator to the core logic;

when the rate of memory access activities is below the rate threshold but the rate of memory access activities is greater than zero, configure the core logic in the low activity operating state, the configuring including setting the switch so that electrical power is provided from the system voltage regulator to the core logic at the reduced voltage; and when the rate of memory access activities is zero, and thus the memory functional block is not performing memory accesses, configure the core logic in either the retention low power operating state or the power off operating state based on an idleness of the core logic.

4. The electronic device of claim 3, wherein the controller is further configured to:

determine a length of an idle period during which the core logic is idle;

when the rate of memory access activities is zero and the length of the idle period is shorter than a time threshold in length, configure the core logic in the retention operating state, the configuring including setting the system voltage regulator so that electrical power is provided to the core logic at the retention voltage; and when the rate of memory access activities is zero and the length of the idle period is longer than the time threshold in length, configure the core logic in the power off operating state, the configuring including setting the system voltage regulator so that no electrical power is provided to the core logic.

5. The electronic device of claim 4, wherein:
the controller includes state machine circuitry; and
the controller is further configured to:
use the state machine circuitry to determine transitions between the full power, the low activity, the retention, and the power off operating states based on the rate of memory activities and/or the length of the idle period.

6. The electronic device of claim 4, wherein:
the controller comprises one or more operating state change limiting mechanisms; and
the controller is configured to use the operating state change limiting mechanisms to limit a rate at which the controller transitions the operating state for the core logic between the full power, the low activity, the retention, and the power off operating states.

7. The electronic device of claim 2, further comprising:
a low dropout (LDO) regulator for the core logic, the LDO regulator having a first input coupled to the power supply input of the core logic and an output coupled to the circuitry in the core logic, the LDO regulator configured to provide electrical power to the circuitry in the core logic;

wherein the LDO is enabled in the full power operating state, so that the circuitry receives electrical power from the memory PHY voltage regulator via the LDO; and wherein the LDO is disabled or bypassed in the low activity operating state, so that the circuitry receives electrical power from the system voltage regulator.

8. The electronic device of claim 7, wherein the LDO voltage regulator includes circuit elements for reducing noise and transient signals.

9. The electronic device of claim 1, wherein:
the memory PHY functional block further includes input-output (IO) circuit elements; and
the memory PHY voltage regulator provides electrical power to the IO circuit elements regardless of an operating state of the core logic.

10. The electronic device of claim 1, wherein the core logic includes one or more of: memory access state machine circuitry, memory access routing controller circuitry, memory PHY clock generation circuitry, and memory PHY state information storage memory circuitry.

11. The electronic device of claim 1, wherein:
the electronic device includes one or more external functional blocks that are separate from the memory functional block; and
the system voltage regulator is configured to provide electrical power to the external functional blocks regardless of an operating state of the core logic.

12. A method for providing electrical power to functional blocks in an electronic device that comprises: a memory functional block that includes a plurality of memory circuits and a memory physical layer (PHY) functional block, the memory PHY functional block including core logic that controls operations of the memory PHY functional block; a memory PHY voltage regulator; a system voltage regulator; a switch having a first input coupled to an output of the memory PHY voltage regulator, a second input coupled to an output of the system voltage regulator, and an output coupled to a power supply input of the core logic; and a controller coupled to the switch, the method comprising:

setting, by the controller, the switch so that electrical power is provided from the memory PHY voltage regulator to the core logic in a full power operating state; and setting, by the controller, the switch so that electrical power is provided from the system voltage regulator to the core logic in each of multiple low power operating states.

13. The method of claim 12, wherein the multiple low power operating states include:

a low activity operating state in which the system voltage regulator provides electrical power to the core logic at a reduced voltage, wherein the reduced voltage is lower than a full operating voltage of circuitry in the core logic, but is sufficient for the circuitry in the core logic to continue limited operation;

a retention operating state in which the system voltage regulator provides electrical power to the core logic at a retention voltage, wherein the retention voltage is lower than the reduced voltage and is not sufficient for the circuitry in the core logic to reliably continue the limited operation, but is sufficient to retain state information for the circuitry in the core logic; and a power off operating state in which the system voltage regulator provides no electrical power to the core logic.

14. The method of claim 13, further comprising:
determining, by the controller, a rate of memory access activities in the memory functional block;
when the rate of memory access activities is above a rate threshold, configuring, by the controller, the core logic in the full power operating state, the configuring including setting the switch so that electrical power is provided from the memory PHY voltage regulator to the core logic;
when the rate of memory access activities is below the rate threshold but the rate of memory access activities is greater than zero, configuring, by the controller, the core logic in the low activity operating state, the configuring including setting the switch so that electrical power is provided from the system voltage regulator to the core logic at the reduced voltage; and
when the rate of memory access activities is zero, and thus the memory functional block is not performing memory accesses, configuring, by the controller, the core logic in either the retention operating state or the power off operating state based on an idleness of the core logic.

15. The method of claim 14, further comprising:
determining, by the controller, a length of an idle period during which the core logic is idle;
when the rate of memory access activities is zero and the length of the idle period is shorter than a time threshold in length, configuring, by the controller, the core logic in the retention operating state, the configuring including setting the system voltage regulator so that electrical power is provided to the core logic at the retention voltage; and
when the rate of memory access activities is zero and the length of the idle period is longer than the time threshold in length, configuring, by the controller, the core logic in the power off operating state, the configuring including setting the system voltage regulator so that no electrical power is provided to the core logic.

16. The method of claim 15, wherein:
the controller includes state machine circuitry; and
the method further comprises:
using, by the controller, the state machine circuitry to determine transitions between the full power, the low activity, the retention, and the power off operating states based on the rate of memory activities and/or the length of the idle period.

17. The method of claim 15, further comprising:
limiting, by the controller, a rate at which the controller transitions the operating state for the core logic between the full power, the low activity, the retention, and the power off operating states.

18. The method of claim 13, wherein:
the memory PHY functional block further comprises a low dropout (LDO) regulator for the core logic, the LDO regulator having a first input coupled to the power supply input of the core logic and an output coupled to the circuitry in the core logic, the LDO regulator configured to provide electrical power to the circuitry in the core logic;
the method further comprises:
enabling, by the controller, the LDO in the full power operating state, so that the circuitry receives electrical power from the memory PHY voltage regulator via the LDO; and
disabling or bypassing, by the controller, the LDO in the low activity operating state, so that the circuitry receives electrical power from the system voltage regulator.

19. The method of claim 18, wherein the LDO voltage regulator includes circuit elements for reducing noise and transient signals.

20. The method of claim 12, wherein:
the memory PHY functional block further includes input-output (IO) circuit elements; and
the method further comprises:
providing, by the memory PHY voltage regulator, electrical power to the IO circuit elements regardless of an operating state of the core logic.

21. The method of claim 12, wherein the core logic includes one or more of: memory access state machine circuitry, memory access routing controller circuitry, memory PHY clock generation circuitry, and memory PHY state information storage memory circuitry.

22. The method of claim 12, wherein:
the electronic device includes one or more external functional blocks are separate from the memory functional block;
the method further comprises:
providing, by the system voltage regulator, electrical power to the external functional blocks regardless of an operating state of the core logic.

* * * * *